United States Patent
Imai et al.

(10) Patent No.: US 6,175,874 B1
(45) Date of Patent: Jan. 16, 2001

(54) PACKET RELAY CONTROL METHOD PACKET RELAY DEVICE AND PROGRAM MEMORY MEDIUM

(75) Inventors: Yuji Imai, Kawasaki; Mitsuhiro Kishimoto, Shinjuku; Tsuneo Katsuyama, Machida, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/020,853

(22) Filed: Feb. 9, 1998

(30) Foreign Application Priority Data

Jul. 3, 1997 (JP) .................................................. 9-178062

(51) Int. Cl.⁷ .................................................. G06F 15/173
(52) U.S. Cl. ............................................ 709/238; 709/205
(58) Field of Search ..................................... 709/104, 105, 709/202, 223, 224, 225, 226, 229, 238, 245, 246, 205, 217, 106; 714/1, 2, 4, 15, 47, 25; 370/351, 401, 409, 389, 911, 260, 484

(56) References Cited

U.S. PATENT DOCUMENTS

| | | | |
|---|---|---|---|
| 5,247,620 | * 9/1993 | Fukuzawa et al. | 709/245 |
| 5,774,660 | * 6/1998 | Brendel et al. | 709/201 |
| 5,787,253 | * 7/1998 | McCreery et al. | 370/351 |
| 5,802,054 | * 9/1998 | Bellenger | 370/401 |
| 5,832,219 | * 11/1998 | Pettus | 709/203 |
| 5,923,654 | * 7/1999 | Schnell | 370/390 |
| 5,923,660 | * 7/1999 | Shemla et al. | 370/402 |
| 6,018,526 | * 1/2000 | Liu et al. | 370/401 |

* cited by examiner

Primary Examiner—Mehmet B. Geckil
(74) Attorney, Agent, or Firm—Staas & Halsey LLP

(57) ABSTRACT

A control method and apparatus for distributing packets to nodes in a cluster, while realizing a single system image at the network address level and such as to be able to simply and dynamically change the distribution destination, conditions of distribution, and the like. A pattern matching unit in a relay device receives packets coming from a packet receiving device. The packets have an address which represents a cluster. Using a distribution control table, pattern matching is performed based on the transmission origin address, transmission origin port, destination port and the like of this packet. A hash calculation unit, from the matching result, performs a hash calculation obtaining the argument of a hash function. A destination node extraction unit sets the destination node of the packet based on the hash result, using the distribution control table.

20 Claims, 14 Drawing Sheets

Pattern Hash Table 10

| Repre-sentative IP | Pattern | | | | Node | |
|---|---|---|---|---|---|---|
| | protoType | srcIP | srcPort | destPort | result | dest. |
| X | TCP | */USE | */NOT-USE | 80/NOT-USE | size=256 | |
| | | | | | 0 | 1 |
| | | | | | ↓ | 1 |
| | | | | | 63 | 1 |
| | | | | | 64 | 2 |
| | | | | | ↓ | 2 |
| | | | | | 127 | 2 |
| | | | | | 128 | 3 |
| | | | | | ↓ | 3 |
| | | | | | 255 | 3 |
| | TCP | */USE | */NOT-USE | 119/NOT-USE | size=256 | |
| | | | | | 0 | 1 |
| | | | | | ↓ | 1 |
| | | | | | 63 | 1 |
| | | | | | 64 | 2 |
| | | | | | ↓ | 2 |
| | | | | | 127 | 2 |
| | | | | | 128 | 3 |
| | | | | | ↓ | 3 |
| | | | | | 255 | 3 |

FIG. 4

MAC Address Table

| Node | MAC addr |
|---|---|
| 1 | i |
| 2 | j |
| 3 | k |

FIG. 5

Pattern Hash Table 10

| Repre-sentative IP | Pattern | | | | Node | |
|---|---|---|---|---|---|---|
| | protoType | srcIP | srcPort | destPort | | |
| X | TCP | */USE | */NOT-USE | 80/NOT-USE | size=256 | |
| | | | | | 0 | 1 |
| | | | | | ↓ | 1 |
| | | | | | 63 | 1 |
| | | | | | 64 | 2→1 |
| | | | | | ↓ | 2→1 |
| | | | | | 84 | 2→1 |
| | | | | | 85 | 2→3 |
| | | | | | ↓ | 2→3 |
| | | | | | 127 | 2→3 |
| | | | | | 128 | 3 |
| | | | | | ↓ | 3 |
| | | | | | 255 | 3 |
| | TCP | */USE | */NOT-USE | 119/NOT-USE | size=256 | |
| | | | | | 0 | 1 |
| | | | | | ↓ | 1 |
| | | | | | 63 | 1 |
| | | | | | 64 | 2→1 |
| | | | | | ↓ | 2→1 |
| | | | | | 84 | 2→1 |
| | | | | | 85 | 2→3 |
| | | | | | ↓ | 2→3 |
| | | | | | 127 | 2→3 |
| | | | | | 128 | 3 |
| | | | | | ↓ | 3 |
| | | | | | 255 | 3 |

FIG. 7

| VC | | | | Node |
|---|---|---|---|---|
| srcIP | srcPort | destIP | dsetPort | |
| B | 2468 | X | 119 | node 32 |

| Repre-sentative IP | Pattern ||||  Node ||
|---|---|---|---|---|---|---|
| | protoType | srcIP | srcPort | destPort | | |
| X | TCP | */USE | */NOT-USE | 80/NOT-USE | size=1 ||
| | | | | | 0 | 1 |
| Y | TCP | */USE | */NOT-USE | 119/NOT-USE | size=1 ||
| | | | | | 0 | 1 |

PACKET RELAY CONTROL METHOD PACKET RELAY DEVICE AND PROGRAM MEMORY MEDIUM

CROSS-REFERENCE TO RELATED APPLICATIONS

This application claims the benefit of Japanese Application No. 9-178062 which is hereby incorporated by reference.

BACKGROUND OF THE INVENTION

The present invention relates to communication mechanisms for computers performing parallel calculation processing in plural packet switched-type networks. In particular, the present application relates to a packet relay control method for realizing load dispersion with high reliability, a packet relay device, and a program memory medium for storing relates program. The present invention also provides a single system image at an address level while distributing request packets, via a network, to appropriate nodes in a cluster.

In a computer network, OSI protocol stack(s) according to ISO, CCITT, or TCP/IP and the like, are used. The protocol stacks act as a transport layer and provide a mechanism which performs communication from a specific process of a transmission host, to a specific process of a reception host. The transport end point is designated by assembling the host designation and service end point designation elements. In TCP/IP, the host designation becomes the IP address, the service end point designation becomes the port number. The receiving computer performs processing which transmits the communication content to the necessary process.

To construct a large scale network server, clusters are used which connect a plurality of personal computers (PC) or workstations (WS). The processing nodes in a cluster have a minimum of one network interface each, and are allotted individual network addresses.

When a client requests a service from a cluster, the client acquires a network address of one node in the cluster and sends a request packet. Normally, the acquisition of a network address requires an inquiry to a name server. The name server performs distributed management of a database using conversion data relating host names, which are a human concept, to network addresses. In a name service, which some name server provides, a cluster appears to be one system, with a plurality of network addresses corresponding to a single host name. For example, the Internet standard DNS (Domain Name System) provides for such name service. The DNS manages the relationship between domain names and IP addresses on the Internet.

When a client makes a request, selecting one address, as each client is different, the request dispersed in nodes within a cluster. When viewed from a client receiving a service, it is desirable for the cluster to appear as though it were a high performance single server. A cluster which appears as one system is said to have a single system image (SSI). By having a SSI, a client can access the cluster in the same way as accessing a single node of a server. One method of implementing an SSI cluster which has plural network interfaces is using round robin DNS.

FIG. 16 is a diagram showing an example of an http cluster consisting of a node 9C (named) which manages 2 processing nodes 9A and 9B (http) and IP addresses. An external network 4 connects user terminals 5A to 5M which receive service from the cluster. In general, the nodes 9A–9C provide service for the user terminals 5A–5M. A router (relay device) connects the external network 4 to a cluster network 92 connecting nodes 9A–9C.

Names on the network of the system are registered and referred to using the DNS. In accordance with the DNS, addresses of plural IPs can be registered in connection with one domain name. In the example shown in FIG. 16, the nodes 9A and 9B appear as one name to the clients of the user terminals 5A–5M. The node "named" (node 9C) realizes the DNS as a record (A record) of an IP address of a domain name, for example: www.domain.co.jp. The IP address of the network interface of nodes 9A, 9B which operate httpd, are registered in a list, such as:

www.domain.co.jp IN A XXX.XXX.XXX.YYY ;; (Address of Node 9A)

www.domain.co.jp IN A XXX.XXX.XXX.ZZZ ;; (Address of Node 9B)

From the client's point of view he can access the whole cluster which the name represents. When there is an inquiry from the client for the record A, the node 9C responds by changing the order. When plural clients access this cluster, because it replies with the IP address of the correct node as an index result, the request is distributed randomly to the httpd nodes 9A and 9B.

Normally, because the user who uses a web client has no IP address and is recognized by a domain name, it is sufficient in many cases if the domain name is by one system image. In other words, a round robin DNS at the domain name level is an SSI. However, at the IP address level, two addresses exist, the address of node 9A and the address of node 9B. Thus, nodes 9A and 9B do not appear as one system. This causes problems such as when a partial failure of a node occurs.

When the node 9A and the node 9B provide the same service, consider the case in which node 9A fails. By an inquiry to the DNS, or a client which has acquired the IP address of the node 9A (which has failed), because no service is received from the node 9A, it appears that the httpd service has stopped. Even if the node 9B puts a connection in motion, insofar as this client does not acquire an address, service is not restored for the client.

SUMMARY OF THE INVENTION

Accordingly, it is an object of the present invention to provide a single system image (SSI) at the address level by distributing a request packet via a network to a node within a cluster.

It is also an object of the present invention to provide a network server which is capable of operating connections.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4 is an example of a distribution control table.

FIG. 5 is an example of a MAC address table.

FIG. 7 is another example of a distribution control table.

DESCRIPTION OF THE PREFERRED EMBODIMENTS

Figure 1:
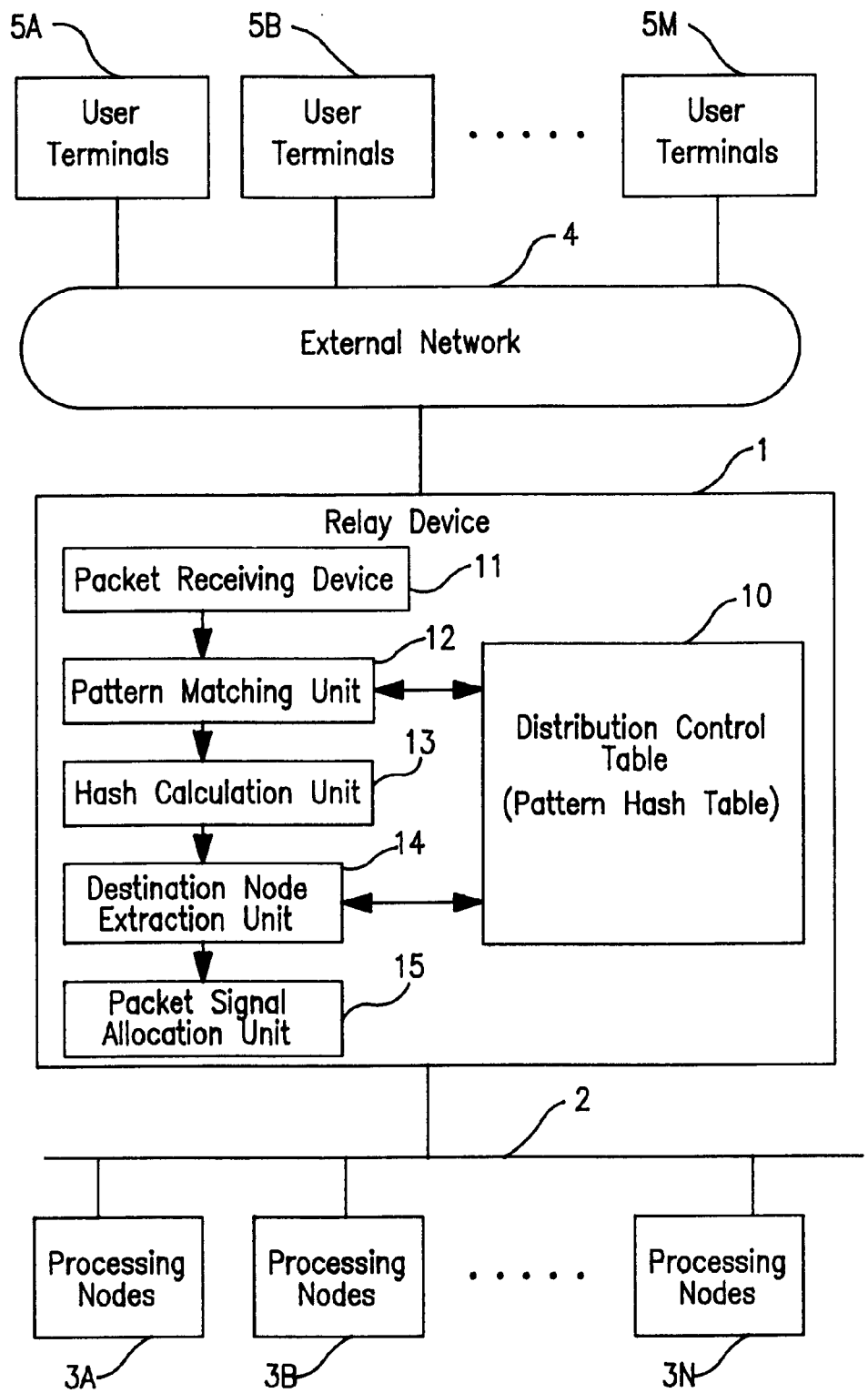
FIG. 1 is a block diagram of the present invention.

Reference will now be made in detail to the present preferred embodiments of the present invention, examples of which are illustrated in the accompanying drawings, wherein like reference numerals refer to like elements throughout.

FIG. 1 is a block diagram of the present invention. A relay device 1 generally comprises a distribution control table 10 (termed a "pattern hash table"); a packet receiving device 11; a pattern matching unit 12; a hash calculation unit 13; a destination node extraction unit 14 and a packet signal allocation unit 15. A cluster network 2 connects the relay device 1 to processing nodes 3A to 3N. An external network 4 connects user terminals 5A–5M to the relay device 1. The relay device 1 and processing nodes 3A–3N constitute one cluster.

The distribution control table (pattern hash table) 10 stores information for selecting processing nodes by hashing using some pattern relating to the transmission origin and destination of packets. The packet receiving device 11 receives packets, which are transferred to an address which represents a cluster, from the external network 4. The pattern matching unit 12 performs matching of patterns defined in the distribution control table 10 for received packets. The hash calculation unit 13 performs hash calculations using parameters determined by the defined pattern. The destination node extraction unit 14 selects a processing node, determined by the distribution control table 10, from the hash result of the hash calculation unit 13. The packet signal allocation unit 15 allocates the packets to the selected processing node 3A–3N. A program which realizes the various processes of the relay device 1 can be stored in a suitable memory medium which a computer is capable of reading and executing.

When the packet receiving device 11, of the relay device 1, receives a packet from a user terminal 5, via the external network 4, the packet receiving device 11 provides information to the pattern matching unit 12. For example, such information may include: the protocol type; the transmission origin address; the transmission origin service end point designated element; and the destination service end point designated element of the received packet. The pattern matching unit 12 performs pattern matching, using the distribution control table 10. Using the result of the pattern matching operation, the hash calculation unit 13 performs hash calculations, using a suitable hash function, set according to the constitution of the distribution control table 10. The destination node extraction unit 14 then determines the destination node to which the packet is to be delivered by referring to the distribution control table 10 using the hash result. The packet signal allocation unit 15 delivers the packet to the node identified by the destination node extraction unit 14.

Thus, in accordance with the present invention, one of the processing nodes 3A–3N is determined to be in charge of the request from the external network 4 by referring to the distribution control table 10 using a hash based on a pattern set according to the characteristics of the packet. This allows a single system image (SSI) to be realized at the network address level. In particular, using the combination of pattern matching and hashing, it becomes possible to realize load dispersion, while simultaneously providing functional dispersion according to the service content. Moreover, it becomes easy to correspond to a single system image which persists unchanged, even when a partial failure has occurred in the processing nodes 3A–3N in the cluster network 2, by dynamically changing the content of the pattern and hash in the distribution control table 10.

Operation of the present invention will be described with respect to TCP/IP, but the present invention is not limited to TCP/IP. In the following description, the terms network address, service end point and the like, will be replaced by the equivalent TCP/IP terms: IP address, port and the like.

In FIG. 1, a cluster is constituted by the relay device 1 and the processing nodes 3A–3N. The processing nodes 3A–3N of the cluster are recognized as a single server having a virtual IP address "X", by the user terminals (client) 5A–5M. In other words, the processing nodes 3A–3N have "X" as a virtual IP address, such that they can respectively independently process an X destination packet.

In the computer which acts as the relay device 1, a general routing program, announces that a virtual IP address exists and provides route information to the external network 4. With this information, the clients 5A–5M of the external network 4 are able to recognize that the relay device 1 is a router to the network to which the server workstation (X) has been connected.

During a routing announcement process, a packet containing a virtual IP address X is generated by the user terminals 5A–5M and arrives at the relay device 1 according to routing information. Simultaneously, a packet, intended for the external network 4, emerges from the processing nodes 3A–3N, and is transmitted toward the relay device 1 through the cluster network 2.

Based on a routing announcement process, the relay device 1 distributes a received packet to a selected processing node from among nodes 3A–3N using the protocol type, transmission origin address (src address), transmission origin port (src port), and destination port (dest port). The processing node is selected using simple pattern matching and hash calculation which utilizes the distribution control table 10.

Figure 2:
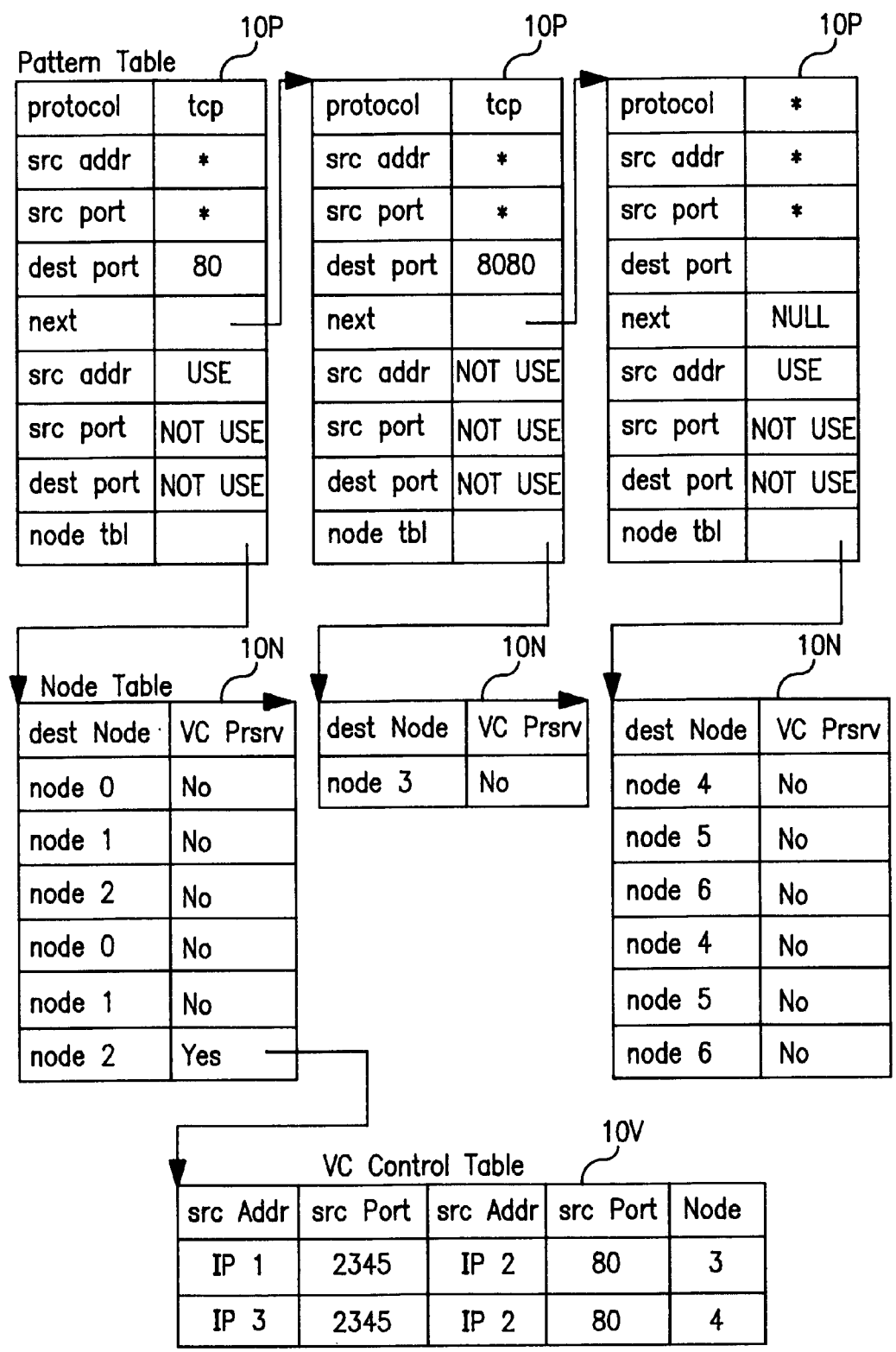
FIG. 2 is a flow diagram showing a distribution control table (pattern hash table).

FIG. 2 is a flow diagram for showing a distribution control table 10. The distribution control table 10 comprises a pattern table 10P, a node table 10N, and a VC control table

10V. The pattern table 10P stores information indicating whether the pattern of the packet and its respective elements are used for the hash, namely information indicating the transfer address/port as arguments of the hash function. The node table 10N is a hash table with processing nodes as an index of hash results. The VC control table 10V preserves the circumstances of VC (virtual circuit) when a failed processing node is restored to the cluster. VC is the name of a communication path served for a credible continuous data transmission in TCP/IP protocol stack. A message sent to the VC moves on a network as TCP/IP datagram. Addresses of origin and destination and port numbers thereof included in TCP/IP header are identical where datagrams of message come from the identical VC.

Referring to FIG. 2, a distribution policy is effected as follows:

(1) A Request to http(80) of the destination port number 80, using the transmission origin address src addr, relays distributing to each processing node of node 0, node 1, node 2.

(2) A Request to http(8080) of the destination port number 8080, relays to the processing node of node 3.

(3) Other requests, hashing the transmission origin address src addr, relays distributing to respective processing nodes of node 4, node 5, node 6.

The "*" in the pattern table 10P denotes a pattern which matches all addresses or ports. Moreover, the "USE/NOT_USE" denotes whether the pattern element is used as a parameter of the hash function.

A suitable hash function, for example, is one which adds, by a 1 byte unit, the whole pattern of the hash parameter. Because the hash result is 8 bits, there are 256 possible entries to the node table 10N. If 4-bit units are added, 16 entries are possible. If all entries are "NOT_USE", setting of the processing node can be performed using a single entry. However, the use of many entries, which take dynamic changes into account, is more desirable. To achieve a hash function, with respect to the node table 10N, the address and size of the node table 10N may be indicated by an argument as opposed to the whole pattern of the hash parameter.

The relay device 1 has another, virtual IP address list, which is omitted from the drawing. The virtual IP address list maintains a list of virtual IP addresses which perform packet distribution using the relay device 1.

The pattern matching unit 12, when packets arrive from the packet receiving unit 11 (DLPI driver), firstly, investigates whether the destination IP address (dest IP address) of the received packet is as mentioned in the virtual IP address. If the destination IP address is mentioned in the list, the pattern matching unit 12 inspects the pattern table 10P, designated according to the IP address. If the destination IP address is not mentioned, the pattern matching unit 12 hands over the packet, unchanged, to a higher rank module.

When the virtual IP address matches at the top of the designated pattern table 10P, hashing is performed using the designated pattern element. When the virtual IP address does not match, the next pattern table 10P is inspected. When there is no next pattern table 10P, the packet is discarded.

In a TCP packet, if the virtual circuit (VC) is the same, its destination IP address (dest IP address), destination port (dest port), transmission origin port (src port), transmission origin IP address (src IP address) are all the same. Because pattern matching is performed using the destination port (dest port), transmission origin port (src port), and transmission origin IP address (src IP address), a packet of the same VC invariably matches with the same pattern, and is delivered to the same processing node.

In a packet which is sent back to a client from the cluster, the IP address of the client is designated in the destination address (dest addr) of the IP header, riding on the routing which is announced by the node of the relay device 1. The packet is transmitted in the direction of the relay device 1 via the cluster network 2, and flows to the external network 4 through the relay device 1.

The distribution policy, is realized by the hash function and the distribution control table. The distribution policy is unrelated to the opening and termination of a TCP_VC session for the following reasons:

(1) It is not necessary for the relay device 1 to be aware of the opening and termination of a VC session. If it is necessary for the relay device 1 to be aware of the opening and termination of a VC session, the relay device 1 must monitor the request packets of opening and termination of TCP. For such monitoring to be performed, with no mismatch in state of the client and server, the logic becomes very complicated, and the overhead becomes very large.

(2) In the event of a failure of the relay device 1 itself, the state just before the failure is restored after having recovered from the failure. Otherwise, it is necessary to restore the state in a separate relay device, to which processing is handed over. In the present invention, a hash function is used and as the distribution control table 10 does not change, no change of the state occurs, and recording and preservation the state (and recovery) become easy.

In accordance with the present invention, distribution processing performs uses two methods of pattern matching:

(1) pattern match and hash method, (2) VC preserving.

The pattern matching and hash methods used in this mode of embodiment will first be described first. In distributed processing, a packet which matches to a specific pattern, is dispersed to respective nodes in a specified cluster using a hash function.

In pattern matching, the protocol type, transmission origin address (src addr), transmission origin port (src port), and destination port (dest port) are used. It is possible to select the parameters of the hash function from among the transmission origin address (src addr), transmission origin port (src port), and the destination port (dest port). The hash result is used as an index, and references a node to determine the processing node which finally sends the packet.

By using the pattern matching and hash method, groups of processing nodes can be set according to type of service, thereby dispersing the load. For example, looking at FIG. 1, in a cluster having four nodes 3A, 3B, 3C, a 3D, the four nodes are dispersed 2:2, in which processing nodes 3A and 3B are dedicated to "http(80/TCP) service", and the processing nodes 3C and 3D are dedicated to "ftp(21/TCP) service". The distribution control table (pattern hash table) 10 in this case would have two patterns:

(protocol type, src addr, src port, dest port)=(TCP, *, *, 80)

(protocol type, src addr, src port, dest port)=(TCP, *, *, 21)

Control information for hashing is according to the patterns:

(src addr,src port,dest port,table)=(USE,NOT-USE,NOT-USE,[1,2])

(src addr,src port,dest port,table)=(USE,NOT-USE,NOT-USE,[3,4])

For example, (TCP, *, *, 80) matches a pattern in which the protocol type is "TCP", and the port number of the destination port is "80". Because the pattern is "*" for the transmission origin address and the transmission origin port, any entry matches. On the other hand, the control information for hash use, (USE, NOT-USE, NOT-USE, [1,2]), performs hashing using the transmission origin address as the hash parameter, showing that the packet is distributed by the hash result to either the first processing node 3A or the second processing node 3B.

In the relay device 1, using a protocol type "TCP", the port number of the destination port is "80". When a packet arrives intended for http, after VC preserving (mentioned later) has been performed, an inspection is performed using the above-mentioned pattern. Because there is a match to the first pattern, hashing is performed using the first of the control information for hash use (hash table). The transmission origin address (src addr) as the argument of the hash function specifies extraction of a value from the IP header of the packet. By using a hash function, which specifies 0 in the transmission origin port (src port) and destination port (des port), either of the processing nodes 3A, 3B are obtained. Accordingly, a packet intended for http is delivered, using the transmission origin address (src addr), to either processing nodes 3A or 3B to be processed.

The following are additional examples of various distribution solutions.
(1) Relaying a packet coming from a specific src address to a determined node. pattern: (TCP, 111.222.33.44, *, *) hash: (NOT-USE, NOT-USE, NOT-USE, [1])
(2) Relaying a packet to a specific dest port to a determined node. pattern: (TCP, *, *, 80) hash: (USE, NOT-USE, NOT-USE, [1,2])
(3) Distributing to n nodes, performs hash with the src address as the key. pattern: (TCP, *, *, *) hash: (USE, NOT-USE, NOT-USE, [1,2])
COMMENT: When providing service to an unspecified large number of clients, a wide variety of src addresses of IP packets are used. By determining the processing nodes in charge from within the n nodes, processing is possible by distributing the request.
(4) Relaying to n nodes, hashing with src address and src port as keys. pattern: (TCP, *, *, *) hash: (USE, USE, NOT-USE, [1,2])
COMMENT: The src port is included as a hash key when load dispersion is minimal (for example in a system with a small number of clients). In order to maintain the uniformity of VC in the TCP, the src port is changed according to the VC. Accordingly, a separate VC node from the same client can give service to different nodes.
(5) Relaying a target to a specific dest port, distributes to n nodes using hash of src address. pattern: (TCP, *, *, 80) hash: (USE, NOT-USE, NOT-USE,[1,2])
COMMENT: Preparing n services dedicated to each protocol and disperses request to n.

Various other combinations can be used. By optionally changing the setting of the distribution control table 10, it becomes possible to easily and dynamically control, according to necessity, the processing nodes of the distribution destination, the proportion of distribution, and the kinds of distributed packets.

Figure 3:
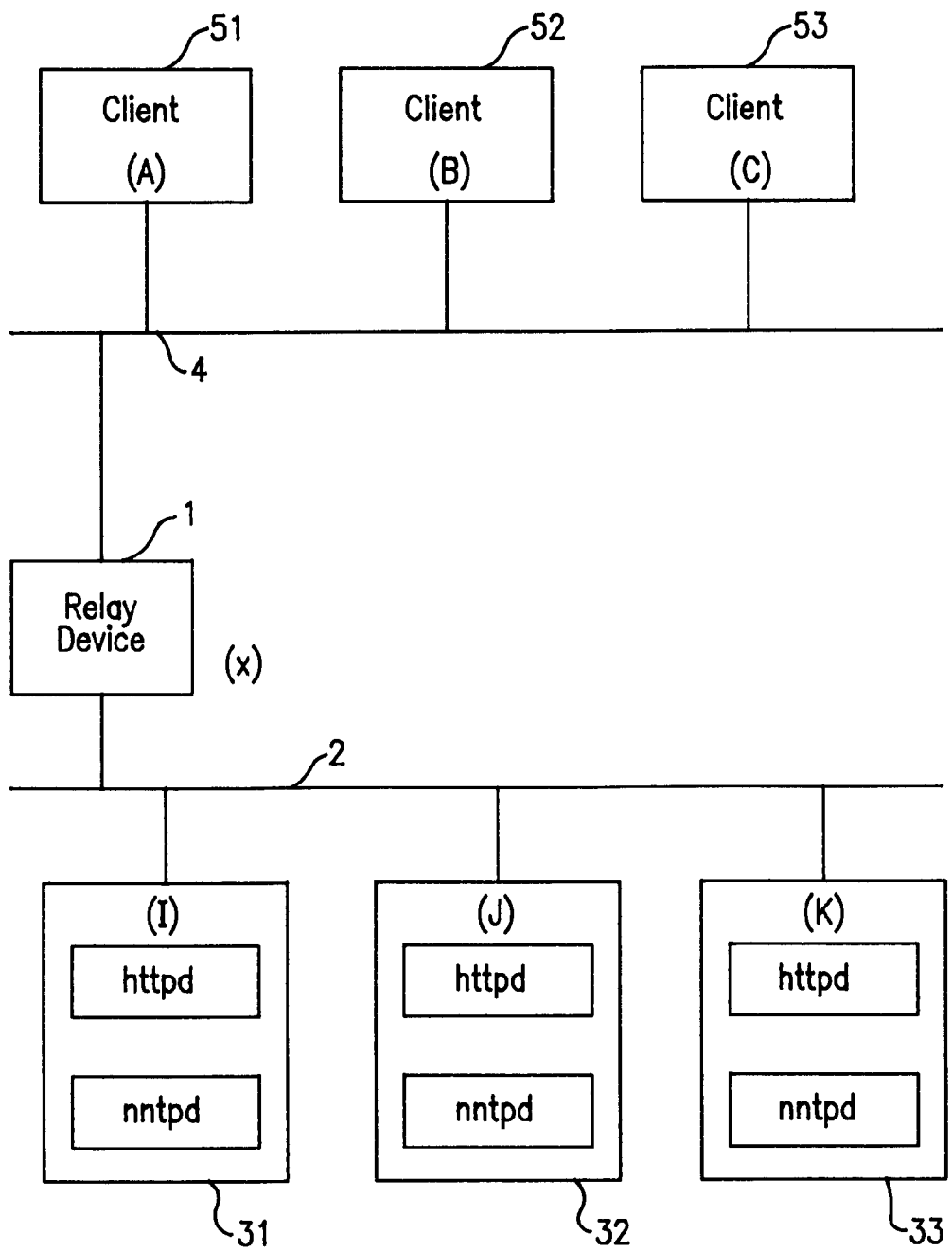
FIG. 3 is a block diagram of a cluster in accordance with a preferred embodiment of the present invention.

FIG. 3 is a block diagram of a cluster in accordance with a preferred embodiment of the present invention. As shown in FIG. 3, the IP addresses of clients 51–53 are, respectively, "A, B, C". The IP addresses of server side nodes 31–33 are, respectively, "I, J, K". The clients' representative IP address is taken as "X". Nodes 31–33, by means of "httpd" and "nntpd", provide internet information service http(80) at the virtual IP address X using hypertext, and message transmission of a netnews service nntp(119). Nodes 31–33 are adjusted so that the processing of requests becomes 1:1:2.

FIG. 4 is an example of a distribution control table. FIG. 5 is an example of a MAC address table. The distribution control table (pattern hash table) 10 is stored in the relay device 1. The MAC address table stores the MAC address for each of the nodes 31–33.

Figure 6:
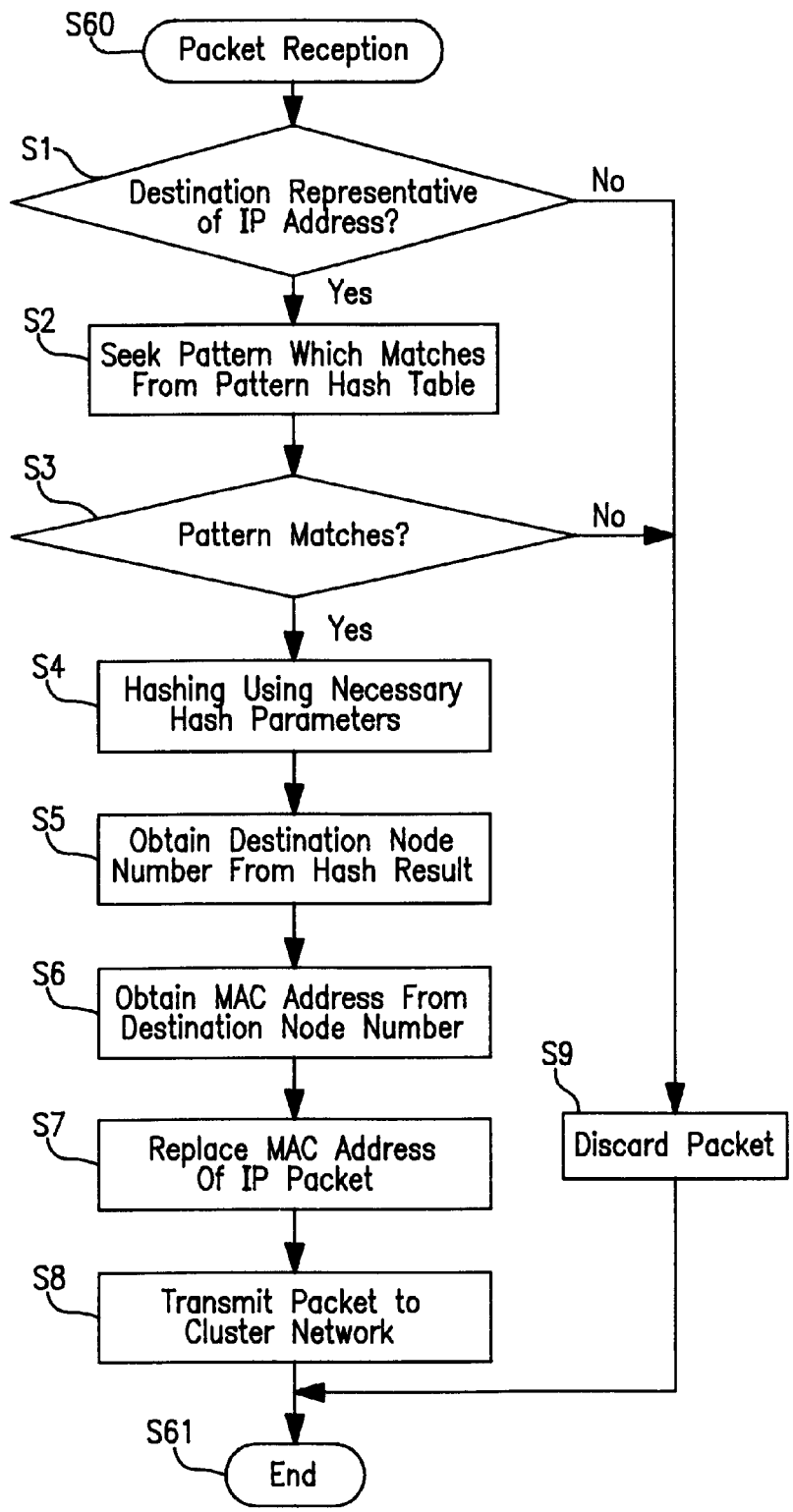
FIG. 6 is a flow chart of the process at the time of receiving a packet.

FIG. 6 is a flow chart of the operation of the relay device 1 of the packet reception time. The process starts in step S60. In step S1, whether the destination of the packet is representative of an IP address is determined. If the destination is representative of an IP address, the routine proceeds to step S2. Otherwise, the routine proceeds to step S9.

In step S2, a pattern which matches is sought from the pattern hash table (shown in FIG. 4) set with respect to the representative IP address. If there is a pattern which matches according to the determination of step S3, in step S3 the routine proceeds to step S4. Otherwise, the routine goes to step S9.

In step S4, hashing is performed using the necessary hash parameters. Namely, by extracting the transmission origin address, the transmission origin port and the destination port from the header, a hash calculation is performed using those parameters which have USE entries in the pattern hash table. Looking at the pattern hash table of FIG. 4, a hash calculation is performed using the transmission origin IP address (srcIP).

Subsequently, in step S5, the destination node number is obtained from the hash result. Specifically, the destination node number is obtained from the resulting ordinal number of the pattern hash table, for example, as shown in FIG. 4. In FIG. 4, if the hash result is 65, the destination node number is 2.

Next, in step S6, the MAC address is obtained from the destination node number. Looking at the example shown in FIG. 5, the MAC address "j" is obtained from the destination node (node number=2).

In step S7, the MAC address of the IP packet is changed. In our example, the X of the IP address is changed to j. In step S8, the packet is transmitted to the appropriate cluster network (2 is our example), and the relay process ends in step S61.

In the fall out route of step S9, because the distribution destination is not defined, the packet is discarded and the process ends in step S61.

Partial failure of a node is detected by a higher rank control manager. The higher rank manager re-registers the node table based on the distribution prior to failure. After transfer of control, for the load to be as equal as possible, a larger size of node table is prepared than the previous node number, and multiple hash entries may be made with respect to the same node. Because the paths are not changed, except for the failed nodes, the VC within the process is continued (except for the failed nodes).

FIG. 7 is another example of a distribution control table 10. Referring to the cluster, shown in FIG. 2, for example, if node 32 failed, the internal distribution control table of the relay device 1 changes as shown in FIG. 7. A range allocated to node number 2 is rewritten to nodes 1 or 3. Looking at FIG. 3, the range allocated to the failed node 32 is directly allocated to other nodes 31 and 33 which have not failed. Thus, the re-distribution is performed such that the allocation of the non-failed nodes is not disordered or disruptive.

Figures 8, 9:
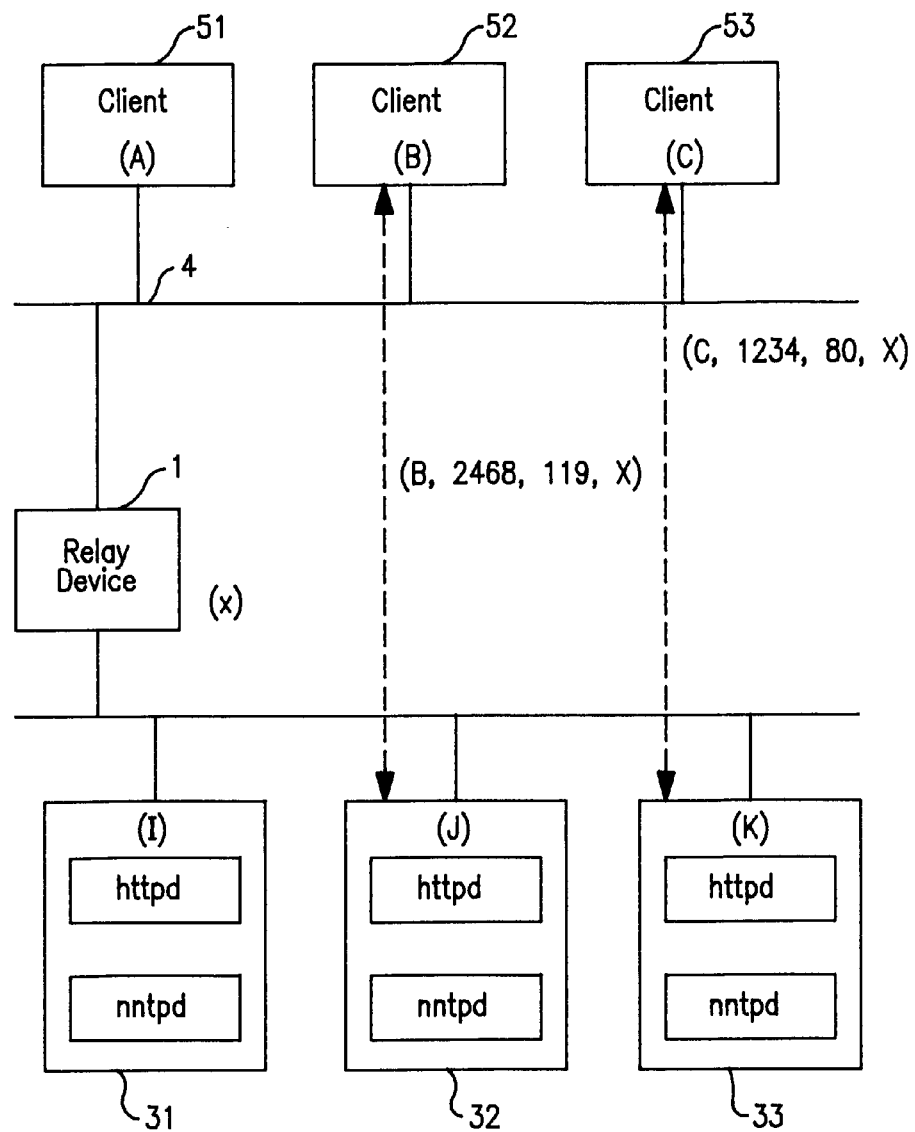
FIG. 8 is a block diagram showing an example of returning a failed node to operation.
FIG. 9 is an example of a VC management table.

FIG. 8 is a block diagram having an example of returning a failed node to operation. Specifically, FIG. 8 illustrates the case in which a failed node was theoretically detached and is caused to return to a cluster after repair. This is similar to returning a node which was detached for maintenance.

As shown in FIG. 8, node 31 has failed and is subsequently repaired. When node 31 returns from failure, the VC is set up in nodes 32 and 33. The VC from client 52 to node 32 is (srcIP, srcPort, dstPort, destIP)=(B, 2468, 119, X) and the VC from client 53 to node 33 is (srcIP, scPort, destPort, destIP)=(C, 1234, 80, X).

When restoring a node and returning the node to the cluster, the concerned item of the changed node table is simply directly written and reset. However, the VC in the process becomes cut off at the node. To avoid this, the state of the VC, before direct resetting, is preserved. Namely, VC preserving is performed.

When sending a specific VC to a specific node, the VC is specified to consist of four items: the transmission origin address, the transmission origin port, the destination port, and the destination address. The relay device 1 stores the VC, setting in the class of the four items and a destination node is set to correspond to the four items. When a packet arrives, the relay device 1 performs pattern matching and delivers the packet to the assigned node.

VC preserving is used to preserve the TCP_VC at hot switch time. A "hot switch" is one which causes a failed node to return to a cluster. To accommodate a new VC in the restored node, the settings of the node table are changed in the distribution control table 10. But during this process, the VC was within the service in the node whose control was transferred, so it is necessary to preserve the VC such that it is not severed.

FIG. 9 is an example of a VC control table 10V. When the VC of (srcIP, srcPort, destPort, destIP)=(B, 2468, 119, X), is being allotted to a new pattern hash table 31, the VC control table 10V as shown in FIG. 9.

Figure 10:
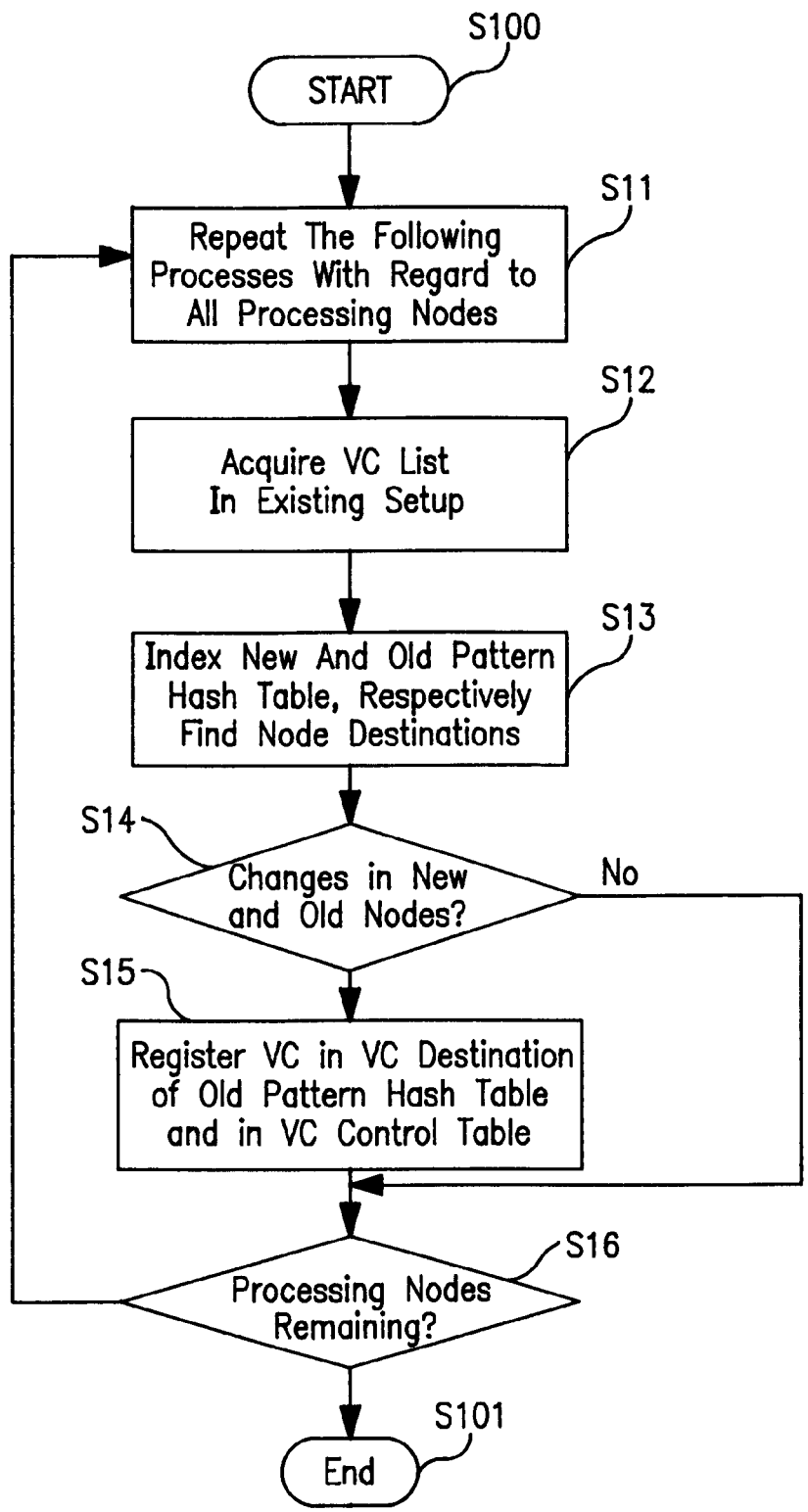
FIG. 10 is a flow chart of a VC control table operation process.

FIG. 10 is a flow chart of the VC management table operation process when a failed node is caused to return to a cluster. The process starts in step S100. In step S11, the following steps S12–S13 are repeated for all the processing nodes. In step S12, the VC list within the existing setup is acquired. In step S13, the old and new pattern hash tables are indexed and the respective node destinations are found.

In step S14, a determination is made as to whether the nodes have changed between the new and old pattern hash tables. When there is a change in the nodes, the process proceeds to step S15. When there is not a change in the nodes, the routine proceeds to step S16.

In step S15, the VC registers the VC destination in the old and new pattern hash tables and in the VC table 10V. In step S16, a determination is made as to whether the process has been completed for all the processing nodes. Until all nodes are processed, the process is repeated, by returning to step S11. When the process has ended for all the processing nodes, the process ends in step S101.

The control manager, after transfer of control is complete, investigates at fixed periods, whether or not VC has ended. If VC has ended, the VC preserving entry in the concerned VC control table 10V is erased. Furthermore, by monitoring a connection cutoff confirmation packet (FIN packet), by detection of a connection cutoff confirmation packet, the concerned VC preserving entry of the VC control table 10V may be automatically erased.

Figure 11:
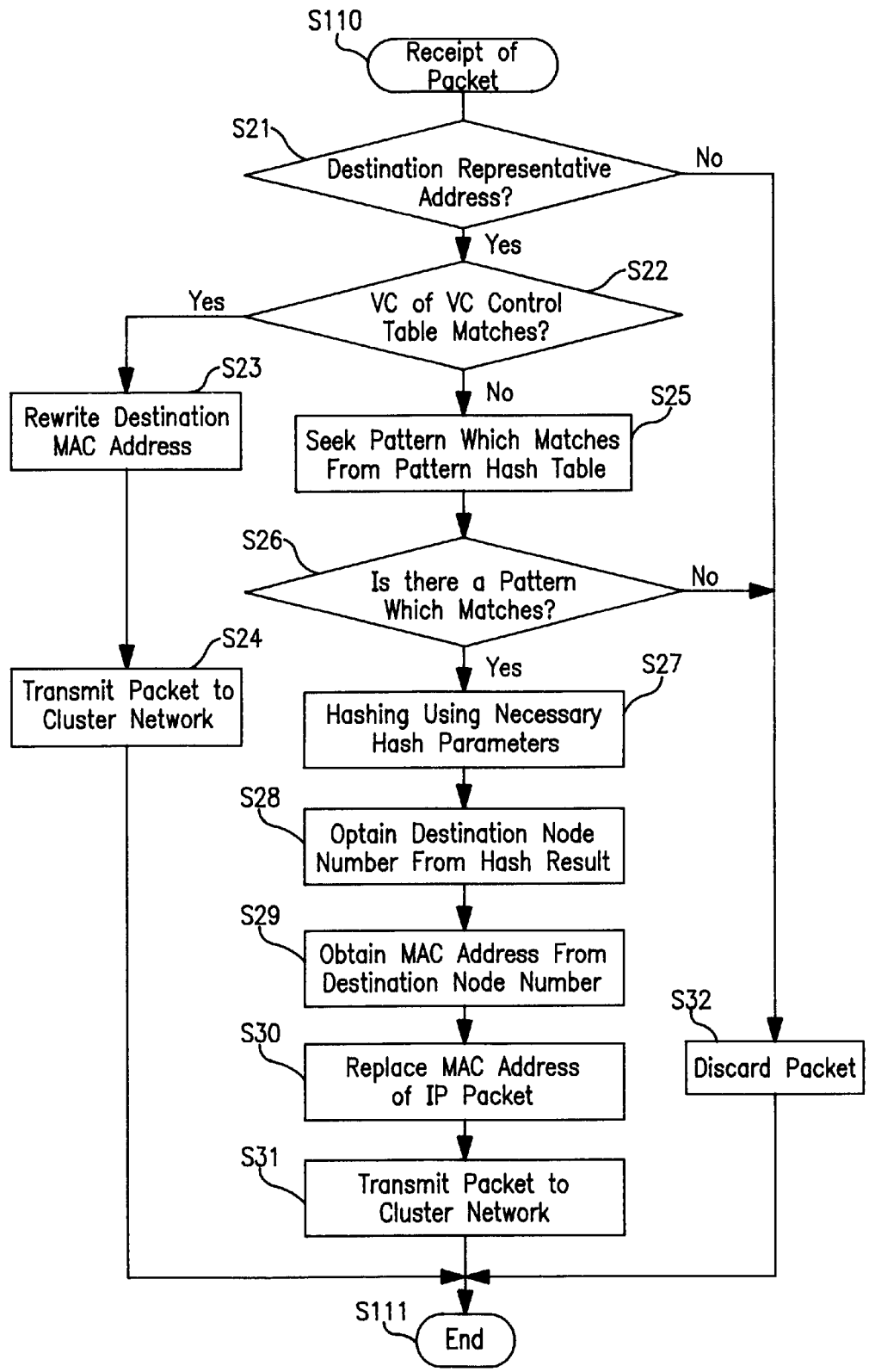
FIG. 11 is a flow chart of the process when receiving a packet when using a VC control table.

FIG. 11 is a flow chart of the process when receiving a packet when using a VC control table. The process starts in step S110. In step S21, a determination is made as to whether the destination of the packet is a representative IP address. If the destination is a representative IP address, the routine proceeds to step S22, otherwise, the routine proceeds to step S32.

In step S22, by observing each entry of the VC control table, a determination is made as to whether the VC control table 10V matches the VC. When a match occurs, the routine proceeds to step S23. Otherwise, the routine proceeds to step S25.

In step S23, the destination MAC address is rewritten according to the VC control table 10V. Thereafter, in step S24, the packet is transmitted to the cluster network 2 and the relay process ends in step S111. Otherwise, in step S25, to distribute the packet to processing nodes, a pattern which matches is sought from the pattern hash table 10. If, in step S26, there was a pattern which matches, the routine proceeds to step S27. Otherwise, the routine proceeds to step S32.

In step S27, hashing is performed using the necessary hash parameters. In step S28, a destination node number is obtained, by referring to the node table 10N using the hash result. In step S29, a MAC address is obtained based on the destination node number. In step S30, the MAC address of the IP packet is replaced. In step S31, the packet is transmitted to the cluster network, and the relay process ends in step S11.

In step S32, because the allocation destination was not defined, the packet is discarded and the process ends in step S111.

Figure 12A:
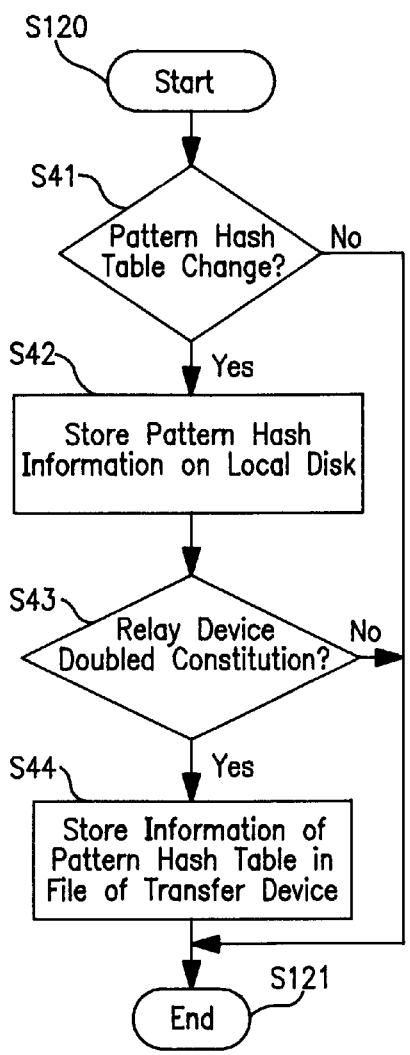
FIGS. 12A and 12B are flow charts of a control information transfer process.
Figure 12B:
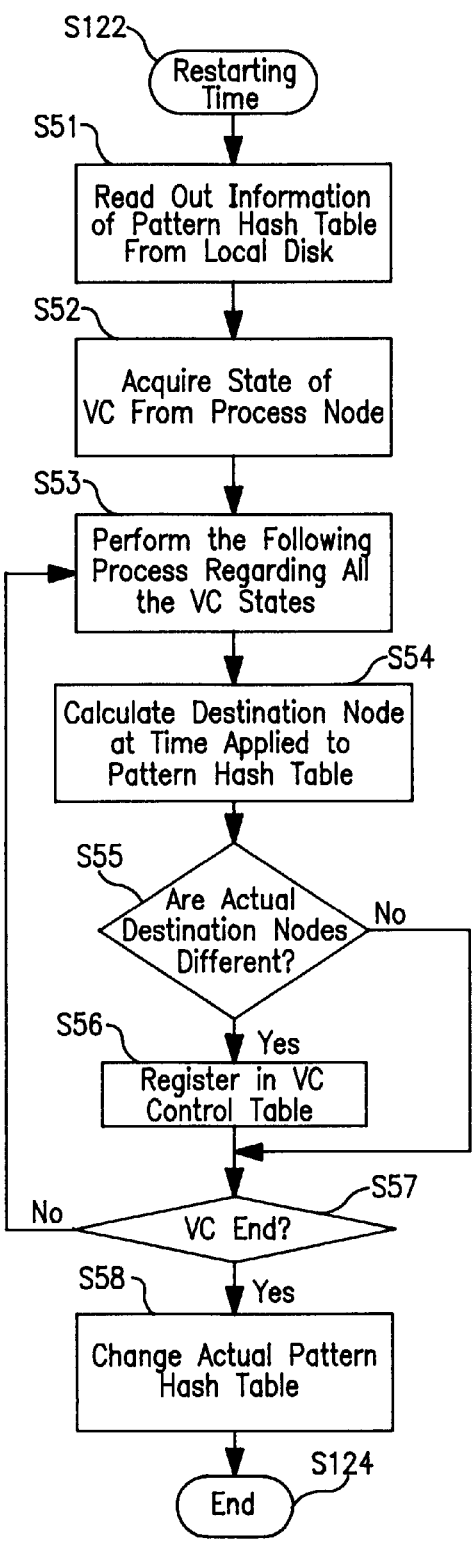

FIGS. 12A and 12B are flow charts of a control information transfer process. FIGS. 12A and 12B are used to describe the case when the relay device 1 is doubled to deal with failure of the relay device 1 itself. In this case, the process at the time of changing the pattern hash table to transfer management information control, and the process at the time of starting up again, are performed as shown in FIGS. 12A and 12B. FIG. 12A is a flow chart of changing the pattern hash table while FIG. 12B is a flow chart of the restarting process.

In FIG. 12A the process starts at step S120. In step S41, a determination is made as to whether there was a change in the pattern hash table. When there has been a change in the pattern hash table, the routine proceeds to step S42, otherwise, the process ends in step S121.

In step S42, pattern hash table is stored in a local disk. In step S43, it is determined whether the relay device 1 is of a doubled constitution. When the relay device 1 is of a doubled constitution, the routine proceeds to step S44, otherwise, the process ends in step S121. In step S44, pattern hash table is stored in a file of the transfer device.

The restarting process starts at step S122. In step S51, the pattern hash table 10 is read from the local disk. In step S52, the state of the VC is acquired from the processing node. In step S53, the process steps S54 to S57 are repeated for all VC states.

In step S54, the destination node, when applied in the pattern hash table, is calculated for the state of each VC. In step S55, it is determined whether the destination node differs from the actual destination node. When the destination nodes differ from the actual destination node, the routine proceeds to step S56, otherwise the routine proceeds to step S57. In step S56, the state of VC is registered in the VC control table.

In step S57, it is determined whether or not the process has ended for all VC states. If all VC states have been processed, the routine proceeds to step S58, otherwise the routine repeats from step S53. In step S58, the actual pattern hash table is changed.

Although the first embodiment of the present invention has been described with respect to a specific configuration, it will be recognized that the first embodiment is not limited to the specific configuration. For example, the relay device 1 may be used in a device having a first device which receives a request packet signal, and a second device which transmits a reply packet. When the relay device 1 is doubled to achieve greater load and function dispersion and either first or second devices fail the function of the failed device may be transferred to the other device.

Figures 13A, 13B:
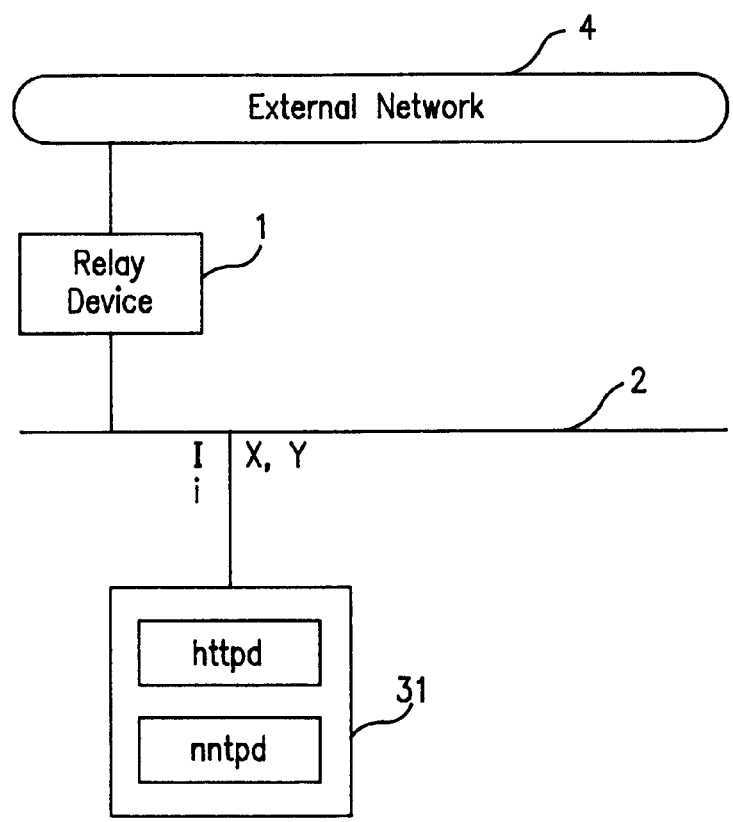
FIGS. 13A and 13B are diagrams showing an example of integrating plural addresses to a single node.

FIGS. 13A and 13B are diagrams showing an example of integrating plural addresses to a single node. For example, as shown in FIG. 13(A), in node 31, a request http(80) is received for an internet information service which uses hypertext, and a request nntp(119) is received for a message conversion service of a net newsgroup. Respective X and Y IP addresses are used. In this case, the pattern hash table is set as shown in FIG. 13(B). In this manner, the pattern hash table references and integrates different plural representative IP addresses in one node.

According to the pattern of the pattern table 10P (shown in FIG. 2) or according to the node of the node table 10N, the number of relayed packets and relay byte number may be counted and recorded. If the recorded count information is available to a control node, which is one of the processing nodes, it becomes possible to easily reset the distribution control table 10 to provide for a uniform load on the processing nodes.

Figure 14:
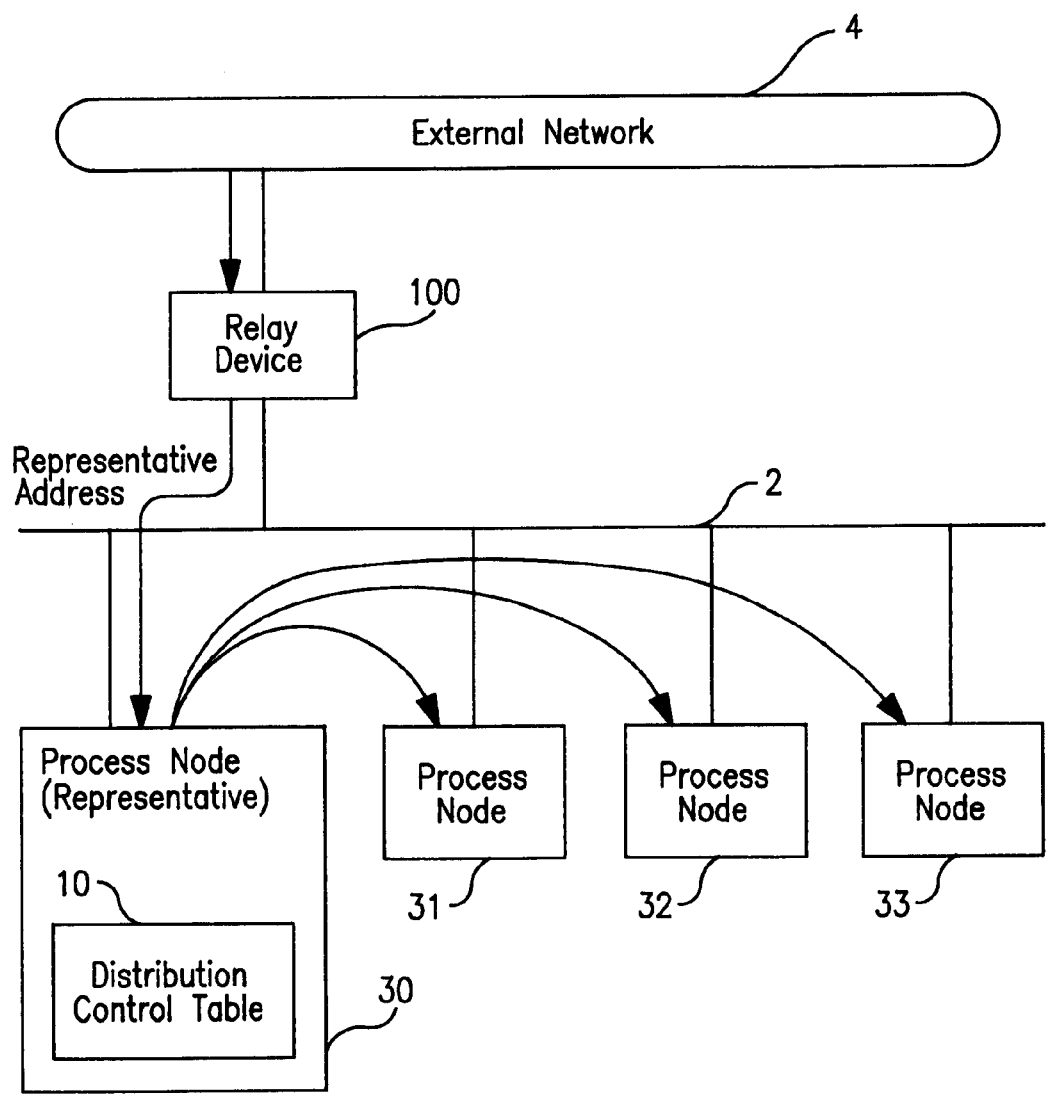
FIG. 14 is a block diagram of a second preferred embodiment of the present invention.

FIG. 14 is a block diagram of a second preferred embodiment of the present invention. In the example shown in FIG. 1, the relay device 1 has a distribution control table 10, and using pattern matching and hashing, packets which went to a representative address of a cluster were distributed to various processing node 3A–3N. As shown in FIG. 14, a relay device 100 connects the external network 4 and the cluster network 2. The relay device 100 performs the functions of a normal router, while one representative processing node 30 among the processing node group, performs a packet distribution function.

The processing node 30 has a corresponding distribution control table 10 (previously started in relay device 1) has a packet receiving device 11, a pattern matching unit 12, a hash calculation unit 13, a destination node extraction unit 14, and a packet distribution device 15. After pattern matching has been performed using the distribution control table 10, (according to the node table (hash table) in the distribution control table 10) a request packet is distributed to the processing node 31–33.

Although the second embodiment of the present invention has been described with respect to a specific configuration, it will be recognized that the second embodiment is not limited to the specific configuration. For example, in the foregoing embodiments, packets have been described as coming from the external network 4 and being distributed to respective processing nodes, but when transmitting a packet exterior from a cluster, it is also possible to provide for concealment of the network address in the cluster by converting the network address.

Figure 15A:
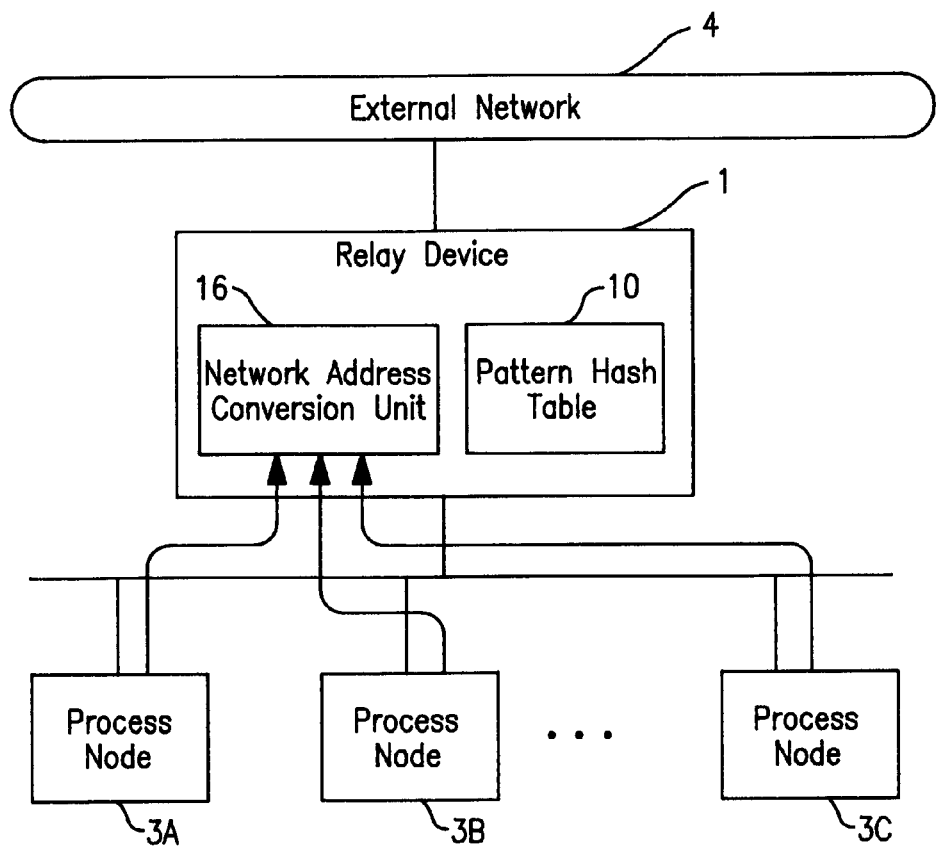
FIGS. 15A and 15B show examples of a system which transmits packets exterior of a cluster while converting the network address in accordance with a third preferred embodiment of the present invention.
Figure 15B:
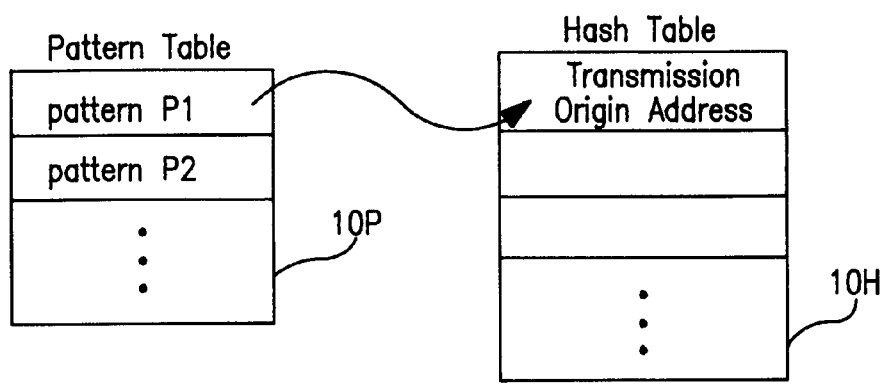
Figure 16:
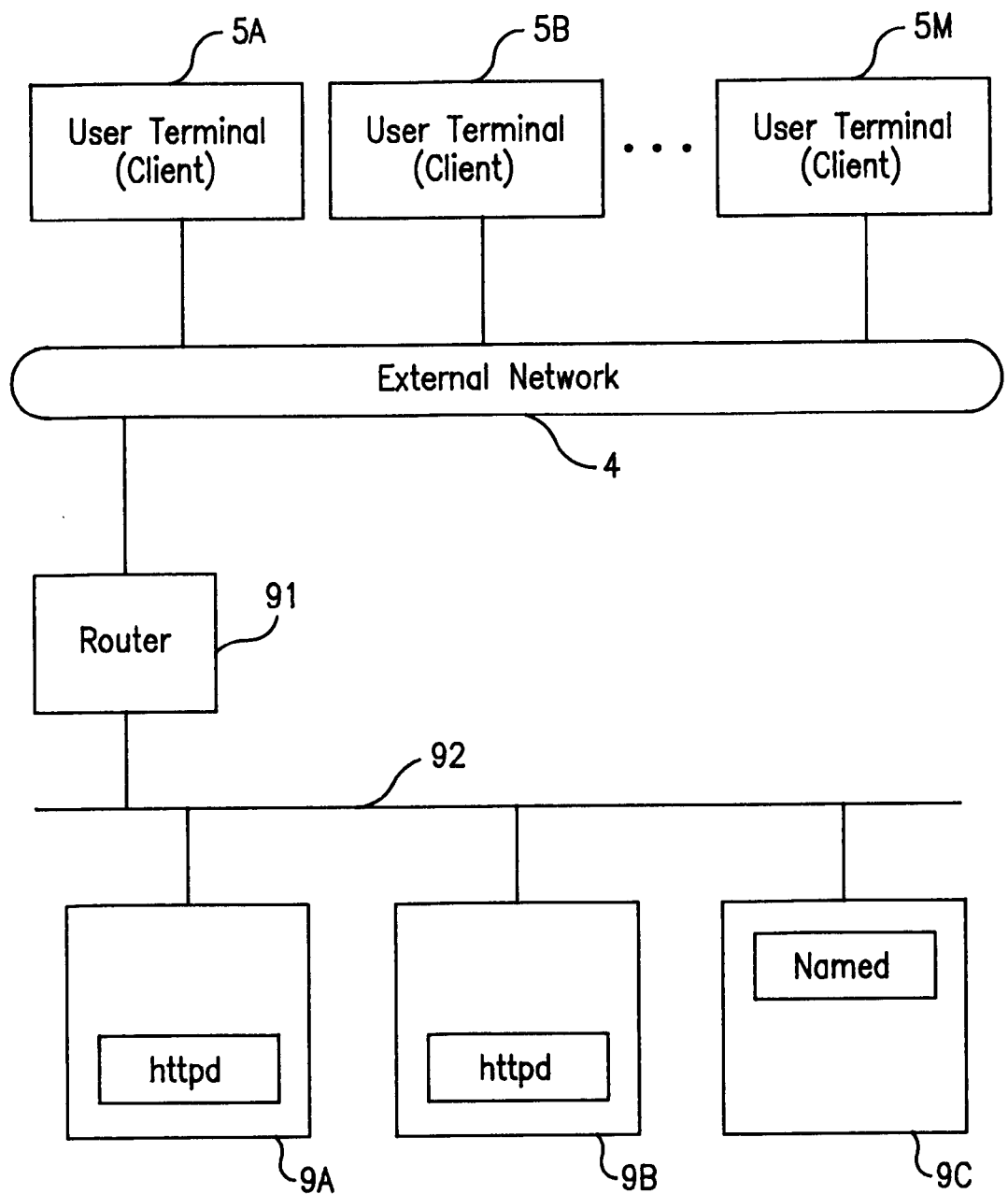
FIG. 16 is a block diagram of a known system.

FIGS. 15A and 15B show an example of a system which transmits packets exterior of a cluster while converting the network address within a cluster in accordance with a third preferred embodiment of the present invention. The relay device 1 has a pattern hash table 10' and a network address conversion unit 16, as shown in FIG. 15(A). When one of the nodes 3A–3N transmits a packet with respect to the external network 4, the network address conversion unit 16, using the pattern hash table 10', rewrites the transmission origin address of the IP header in the packet to another transmission origin address. For example, by rewriting the address of the processing node 3A and the processing node 3B to a common transmission origin address, it becomes possible for the processing node 3A and the processing node 3B to appear, from the exterior, as one node.

The pattern hash table 10' consists, as shown in FIG. 15B, of a pattern table 10P and a hash table 10H. The pattern table 10P is similar to the pattern table 10P shown in FIG. 2, while the hash table 10H is similar to the node table 10N. However, destination nodes are not referred for each hash entry. The process of pattern matching and hash in the network address conversion unit 16 are similar to the above-described process for a request packet.

Although a few preferred embodiments of the present invention have been shown and described, it would be appreciated by those skilled in the art that changes may be made in these embodiments without departing from the principles and spirit of the invention, the scope of which is defined in the claims and their equivalents.

In accordance with the present invention, a single system image is realized at the network address level. It is possible to allocate a packet by setting the destination node in the cluster using pattern matching and hashing. The conditions of distribution of packets may be optionally set by setting information in a pattern hash table. Furthermore, it is also possible to easily change the distribution destination of a packet, considering the circumstances of processing load dispersion, kinds of packets or nodes, by dynamically changing the pattern hash table. Moreover, maintaining a VC control table, the state of VC can be maintained, and a transfer or restoration process can easily be performed using a doubled constitution, even in the case of failure and the like. In this manner, high speed load dispersion achieved using the address pattern of a cluster network request and continuous operation becomes possible even during a node failure, due to maintenance, partial stoppage or the like.

What is claimed is:

1. A packet relay control method, for distributing packets to a cluster having a plurality of processing nodes, said method comprising:

creating a distribution control table storing information to enable identification of an appropriate processing node by hashing with respect to several patterns relating to a transmission origin and a destination of the packets;

matching patterns defined in the distribution control table for packets sent from an external network to addresses within the cluster;

selecting the appropriate processing node from among the plurality of processing nodes by hashing using the distribution control table and a matching pattern for a corresponding packet; and distributing the corresponding packet to the appropriate processing node.

2. A packet relay control method as set forth in claim 1, wherein the matching pattern includes at least one of a transmission origin service end point designated element and a destination service end point designated element.

3. A packet relay control method as set forth in claim 1, wherein the patterns are formed of elements, and wherein said method further comprises:

creating the distribution control table using information indicating whether to use individual elements of the patterns as hash parameters; and extracting the individual elements of the matching pattern for use as corresponding hash parameters of the corresponding packet.

4. A packet relay control method as set forth in claim 1, further comprising:

counting and recording at least one of a number of relayed packets and a relay byte number as recorded count information, according to at least one of the matching pattern and a hash item, wherein the recorded count information can be referenced from the external network.

5. A packet relay control method as set forth in claim 1, wherein correspondence between the patterns and hash outputs defined by the distribution control table are changeable.

6. A packet relay control method as set forth in claim 5, further comprising when a processing node fails, dynamically changing the distribution control table, so that a hash output which normally points to a failed processing node points to an operating processing node.

7. A packet relay control method as set forth in claim 5, further comprising when changing the distribution control table during operation, setting a virtual circuit preservation pattern to preserve an existing virtual circuit.

8. A packet relay control method as set forth in claim 7, further comprising:
monitoring connection severance confirmation packets; and
automatically deleting an entry of a virtual circuit preservation pattern based on detection of a connection severance confirmation packet.

9. A packet relay control method as set forth in claim 7, further comprising:
while not monitoring a connection severance confirmation packet, inquiring about existing connections in a server of the processing nodes;
confirming that the existing connections have become null; and
concurrently performing delayed erasure of an entry of the virtual circuit maintenance pattern.

10. A packet relay control method as set forth in claim 1, wherein plural addresses represent the cluster, and
wherein said method further comprises relaying, to integrate in one processing node, the packets to the plural addresses.

11. A packet relay control method as set forth in claim 1, further comprising:
providing to a device connecting the external network to the cluster and to at least one of the processing nodes, a copy of control information regarding the state of the distribution control table; and
when restarting after failure of the device, or when handing over processing to another device, recovering using the copy of the control information provided to the at least one of the processing nodes.

12. A packet relay control method, for distributing packets in a cluster network having a plurality of processing nodes, said method comprising:
creating, in a representative node within the cluster network, a distribution control table storing information used to set an appropriate processing node for receiving a packet by hashing with respect to a pattern related to a transmission origin and destination of the packet,
matching the packet with the pattern;
selecting the appropriate processing node by hashing using the distribution control table and using matched information in the packet for the hashing; and
allocating the packet to the appropriate processing node.

13. A packet relay device for use with a cluster having a plurality of processing nodes, said packet relay device comprising:
a memory unit storing a distribution control table which indicates an appropriate processing node by hashing with respect to a pattern relating to a transmission origin and a destination of received packets;
a packet receiving unit which receives packets coming to an address representing the cluster;
a pattern matching unit, coupled to said packet receiving unit and said memory unit, which performs matching of a defined pattern, stored in said distribution control table and in received packets;
a hash calculation unit, coupled to said pattern matching unit, which performs a hash calculation using the defined pattern matched by said pattern matching unit and outputs a hash result;
a destination node extraction unit, coupled to said hash calculation unit, which selects the appropriate processing node indicated by the hash result; and
a packet signal allocation unit, coupled to said destination node extraction unit, which allocates the packet to the appropriate processing node.

14. A computer program embodied on a computer-readable medium, for controlling a computer to perform a method of distributing packets to appropriate nodes within a cluster, comprising:
receiving incoming packets to an address which represents a cluster;
hashing using a distribution table which sets an appropriate processing node with respect to a pattern related to a transmission origin and a destination of packets;
selecting the appropriate processing node indicated by a hash result; and
distributing the packets to the corresponding processing nodes.

15. A packet relay control method for a cluster network having a plurality of processing nodes, said method comprising:
creating a pattern hash table of network addresses by hashing with respect to a pattern relating to a transmission origin and a destination of a packet, matching patterns defined in the pattern hash table for packets which depart and arrive the processing nodes to and from an external network; and
changing the network addresses of the processing nodes based on a hash function.

16. A packet relay device for a cluster having a plurality of processing nodes, the packet relay device comprising:
storage means for storing a pattern hash table which indicates network addresses by hashing with respect to a pattern relating to a transmission origin and a destination of packets;
transmitting means for sending and receiving packets between the plurality of processing nodes and an external network;
pattern matching means for matching of the patterns defined in the pattern hash table and in the packets;
hashing means for generating hash results from hash calculations using parameters set by said pattern matching means;
extracting means for extracting network addresses of appropriate processing nodes in the pattern hash table obtained using the hash results; and
changing means for changing the network addresses of the processing nodes in packets which depart and arrive as signals.

17. A computer program embodied on a computer-readable medium for controlling a computer to perform a method of distributing packets to appropriate processing nodes in a cluster, comprising:

sending and receiving signals to relay the packets between processing nodes and an external network;

matching patterns defined in a pattern hash tables, using the pattern hash table to set network addresses by hashing with respect to a pattern relating to a transmission origin and a destination of the packets;

performing hash calculations using parameters indicated by the pattern;

extracting network addresses of the appropriate processing nodes using results of the hash calculations; and changing the network addresses set by the pattern hash table for the appropriate processing nodes corresponding to the packets.

18. A method of distributing packets to individual nodes in a cluster referenced by a single virtual address, said method comprising:

creating a hash table which indexes hash results to the individual nodes in the cluster;

receiving a packet;

hashing using at least one characteristic of the packet, to generate a hash result;

comparing the hash result to the hash table to find a corresponding individual node in the cluster; and distributing the packet to the corresponding individual node.

19. A method according to claim 18, wherein the hash table is created with a pattern table which indicates characteristics of the packet to use for hashing.

20. A method according to claim 18, wherein the hash table is created with multiple tables which are used according to the at least one characteristic of the packet.

* * * * *

UNITED STATES PATENT AND TRADEMARK OFFICE
CERTIFICATE OF CORRECTION

PATENT NO.   : 6,175,874 B1
DATED        : January 16, 2001
INVENTOR(S)  : Yuji Imai et al.

It is certified that error appears in the above-identified patent and that said Letters Patent is hereby corrected as shown below:

<u>Column 14,</u>
Line 39, begin paragraph with "matching".

<u>Column 15,</u>
Line 5, change "tables" to -- table --.

Signed and Sealed this

Twenty-fifth Day of September, 2001

Attest:

NICHOLAS P. GODICI
*Attesting Officer*     *Acting Director of the United States Patent and Trademark Office*